(12) United States Patent
Heisel et al.

(10) Patent No.: US 6,187,401 B1
(45) Date of Patent: Feb. 13, 2001

(54) DOUBLE-WALLED BODY

(75) Inventors: Uwe Heisel, Stuttgart; Martin Gringel, Hechingen, both of (DE)

(73) Assignee: Blüco-Technik Blümle KG (DE)

( * ) Notice: Under 35 U.S.C. 154(b), the term of this patent shall be extended for 0 days.

(21) Appl. No.: 09/171,427

(22) PCT Filed: Mar. 22, 1997

(86) PCT No.: PCT/EP97/01467

§ 371 Date: Oct. 19, 1998

§ 102(e) Date: Oct. 19, 1998

(87) PCT Pub. No.: WO97/39887

PCT Pub. Date: Oct. 30, 1997

(30) Foreign Application Priority Data

Apr. 19, 1996 (DE) ............................................. 196 15 505

(51) Int. Cl.$^7$ ..................................................... E04B 1/62
(52) U.S. Cl. .......................... 428/36.9; 428/116; 428/117; 428/131; 428/138; 52/402; 52/783.1
(58) Field of Search ............................. 428/73, 72, 36.9, 428/117, 116, 36.91, 36.92, 131, 138; 181/290, 292; 52/402, 793.1, 783.1

(56) References Cited

U.S. PATENT DOCUMENTS

| 2,837,788 | 6/1958 | Keine | 52/789.1 |
| 4,774,121 | 9/1988 | Keine | 428/117 |
| 4,931,340 | * 6/1990 | Baba et al. | 428/73 |
| 4,998,619 | * 3/1991 | Sowa et al. | 206/392 |
| 5,143,768 | * 9/1992 | Wilderman et al. | 428/68 |
| 5,338,594 | * 8/1994 | Wang et al. | 428/117 |
| 5,445,861 | * 8/1995 | Newton et al. | 426/116 |
| 5,716,693 | * 2/1998 | Pittman | 428/178 |

FOREIGN PATENT DOCUMENTS

| 630464 | 7/1963 | (BE) . |
| 506017 | 4/1971 | (CH) . |
| 4429779 | 5/1995 | (DE) . |
| 2086337 | 12/1971 | (FR) . |

* cited by examiner

*Primary Examiner*—Rena L. Dye
(74) *Attorney, Agent, or Firm*—Ostrolenk, Faber, Gerb & Soffen, LLP

(57) ABSTRACT

The invention proposes a double-walled body with cover panels between which spacers are arranged. The double-walled body is distinguished in that the spacers are designed as cylinders, in particular tubes (6), of which the cylinder axes run orthogonally with respect to the cover-panel surfaces, in that one set of tubes (6) (first tubes (7)) is of a length which corresponds to the clear width between the cover panels (3, 5), and in that another set of tubes (6) (second tubes (9)) engages in, or through, apertures (13) in the cover panels (3, 5) by way of the end regions (11) in each case, and in that the interior of at least some of the second tubes (9) accommodates fastening means, in particular threaded bushes.

15 Claims, 3 Drawing Sheets

DOUBLE-WALLED BODY

BACKGROUND OF THE INVENTION

The invention relates to a double-walled body with cover panels between which spacers are arranged.

Double-walled bodies of the type mentioned here can be used wherever there is a need for structures of low mass and a high degree of rigidity, for example for fast-moving machine tables. Previous lightweight structures have been produced by a sandwich construction method, but the rigidity of these does not always satisfy requirements. Also known are extremely machining-intensive integral construction methods with high-outlay cast or welded structures, which are complex and expensive to produce.

SUMMARY OF THE INVENTION

The object of the invention is thus to provide a double-walled body which has good rigidity properties and is relatively straightforward and cost-effective to produce.

In order to achieve this object, a double-walled body which has spacer between the walls is proposed. It is distinguished in that the spacers are designed as cylinders, in particular tubes, of which the cylinder axes run orthogonally with respect to the cover-panel surfaces, in that one set of tubes (first tubes) is of a length which corresponds to the clear width between the cover panels, and in that another set of tubes (second tubes) engages in, or through, apertures in the cover panels by way of the end regions in each case, and in that the interior of at least some of the second tubes accommodates fastening means, in particular threaded bushes. The task of the first tubes is to fix the distance between the cover panels while the double-walled body is assembled. This is a straightforward way of ensuring that the cover-panel surfaces are aligned precisely parallel to one another at a desired distance apart. The second tubes are longer than the first tubes, and this means that their end regions at least extend into, and preferably engage through, the apertures in the cover panels, thus connecting the cover panels to one another. The cover panels and the tubes can thus be assembled quickly and easily without any other auxiliary means, for example spacers and clamping elements. Following assembly of the double-walled body, fastening means which serve for receiving, for example, clamping and/or retaining elements are introduced into the second tubes. The double function of the second tubes, namely connecting the cover panels and receiving fastening means, eliminates further machining operations, for example providing receiving and/or threaded bores in the double-walled body, in order to provide possible fastening means for subassemblies, for example a drive unit, as a result of which the double-walled body can be produced in a straightforward and cost-effective manner.

A preferred embodiment of the double-walled body is one in which the tubes are supported against one another by way of their lateral surfaces. The tubes are arranged between the cover panels such that each tube is adjacent to at least one further tube. The arrangement of the tubes with respect to one another may be such that their lateral surfaces are in contact with one another. This additionally increases the bending and torsional strength of the double-walled body.

A particularly preferred embodiment of the double-walled body is distinguished in that the end regions of the tubes are joined to the corresponding cover panel. This achieves a high degree of rigidity for the entire panel and tube structure. Joining takes place by means of an integrally bonding joining method, welded joints being preferred as a result of their high bending and torsional strength and of the optimum flux of force. If the double-walled body is subjected to relatively low loading then soldered joints and/or adhesive bonds are also possible. Laser welding is the proposed welding method since, as a result of their concentrated heat intensity, lasers have only a small active region, this resulting in joining with low degrees of warpage and stressing. The use of numerically controlled welding robots, which can be controlled by means of a CAD/CAM coupling, makes it possible to automate assembly of the double-walled body, with the result that the production costs are reduced. It is also conceivable for the cover panels and the tubes to be joined to one another in a frictionally locking manner, at least in some regions of the double-walled body. This improves, for example, the handling of preassembled cover panels and tubes, that is to say cover panels and tubes which have not yet been joined to one another.

Also preferred is an embodiment of the double-walled body in which the tubes are cut to length from bar stock by a cutting method, in particular laser cutting, and are used for setting up the double-walled body without any further machining. The clean, precise, that is to say planar, cut surface of the laser-cut tubes means that further machining, for example deburring, is not necessary, with the result that the tubes can be fitted directly. It is also possible here to use numerically controlled cutting machines in order to reduce the costs. The term "cutting method" also covers machining methods, for example cutting into, or cutting off, the bar stock by means of a suitable cutoff tool in a lathe.

Also preferred is an embodiment of the double-walled body which is distinguished in that, at their ends, the tubes each have planar end surfaces which run orthogonally with respect to the cylinder axes, in particular tube axes. This ensures that the cover-panel surfaces are positioned flush on the end surfaces of the first tubes, and that the distance between the cover panels at any point is constant within a narrow tolerance range.

A particularly preferred embodiment of the double-walled body is distinguished in that the fastening means are retained in the second tubes by means of a filling of plastic. It is possible for the remaining annular space between the inner lateral surface of the tubes and the outer surface of the fastening means to be filled with a suitable, hardening foaming or casting compound. This means that the fastening means are quickly and cost-effectively fixed in position on the double-walled body.

Also preferred is an embodiment of the double-walled body in which the bore of the second tubes has a thread and/or is designed as a close-fit bore, preferably with a press fit, into which correspondingly designed fastening means can be respectively screwed or inserted. The thread and the close fit can be produced before the double-walled body is assembled, for example before the operation of cutting to length from bar stock. This eliminates the need for reclamping of the tubes and of the double-walled body, as a result of which the production times are reduced.

Also preferred is an embodiment of the double-walled body in which the tubes are designed as polygonal tubes. Since the tubes are supported against one another when subjected to bending and/or torsion, the planar surfaces on the exterior of the tubes cause the forces which act on the tubes when the latter are subjected to loading to be distributed, as a result of which the surface pressure is reduced. This makes it possible to use tubes with relatively thin walls, as a result of which the overall weight of the double-walled body is reduced.

Finally, also preferred is an embodiment of the double-walled body in which the space between the two cover panels has a foamed-plastic filling. This quasi-embedding of the tubes in a filling prevents noise-inducing and disrupting vibrations, which may be caused, for example, by the first tubes, and the penetration of dirt. Furthermore, the bending and torsional strength of the double-walled-body structure is increased.

BRIEF DESCRIPTION OF THE DRAWINGS

The invention is explained in more detail hereinbelow with reference to the drawing, in which.

DESCRIPTION OF A PREFERRED EMBODIMENT

The double-walled body described hereinbelow can be used in general wherever there is a need for structural elements of low mass and a high degree of rigidity, in particular bending and torsional strength. Structures of this type are preferably used as machine tables in high-speed machines. A further application area is in vehicle and aircraft construction, since the aim in these cases is to have a lightweight construction method in order to keep the energy consumption of the drive units used low.

Figure 1:
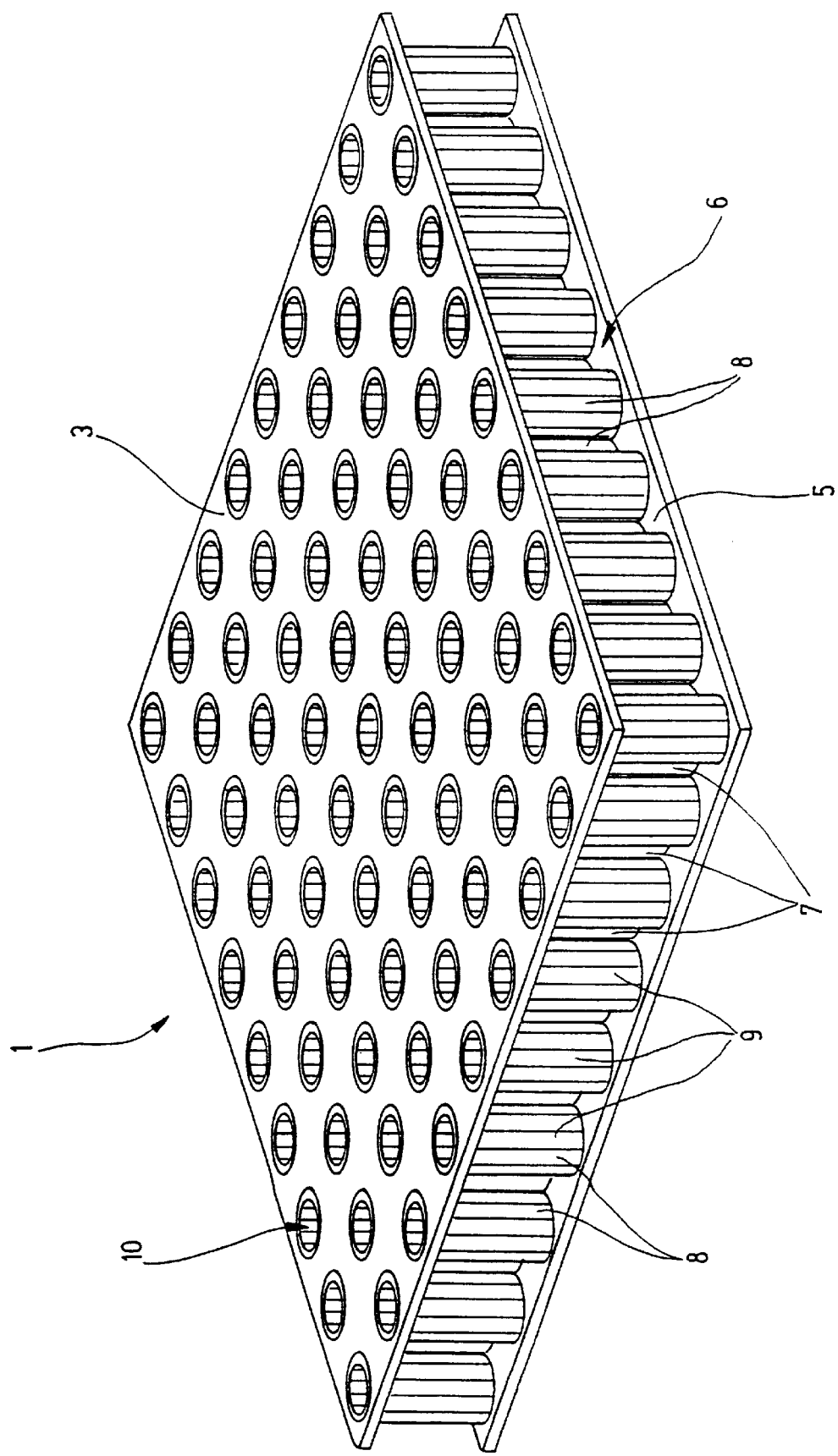
FIG. 1 shows a perspective view of a first exemplary embodiment of a double-walled body.

FIG. 1 shows a double-walled body 1 with a top cover panel 3 and a bottom cover panel 5. Tubes 6 of different length are arranged between the cover panels 3, 5. Thus, a first set of tubes, referred to hereinbelow as first tubes 7, is shorter than a second set of tubes, referred to hereinbelow merely as second tubes 9. The exterior 8 of the tubes 6 is designed—as seen in cross section—as a regular polygon and the bore 10 through the tubes is of circular design. The surfaces which thus extend around the periphery of the exterior 8, over the length of the tubes, serve as an abutment for adjacent tubes. It is possible to vary the geometrical cross-sectional shape of the exterior 8 and of the bore 10, with the result that, for example, the bore 10 has a rectangular cross section and the exterior 8 has a curved cross section.

Depending on the material properties required, the tubes 6 and the cover panels 3 and 5 may be produced from metal, plastic or the like. The following is based on the assumption that the tubes 6 and the cover panels 3 and 5 consist of weldable metal.

Figure 2:
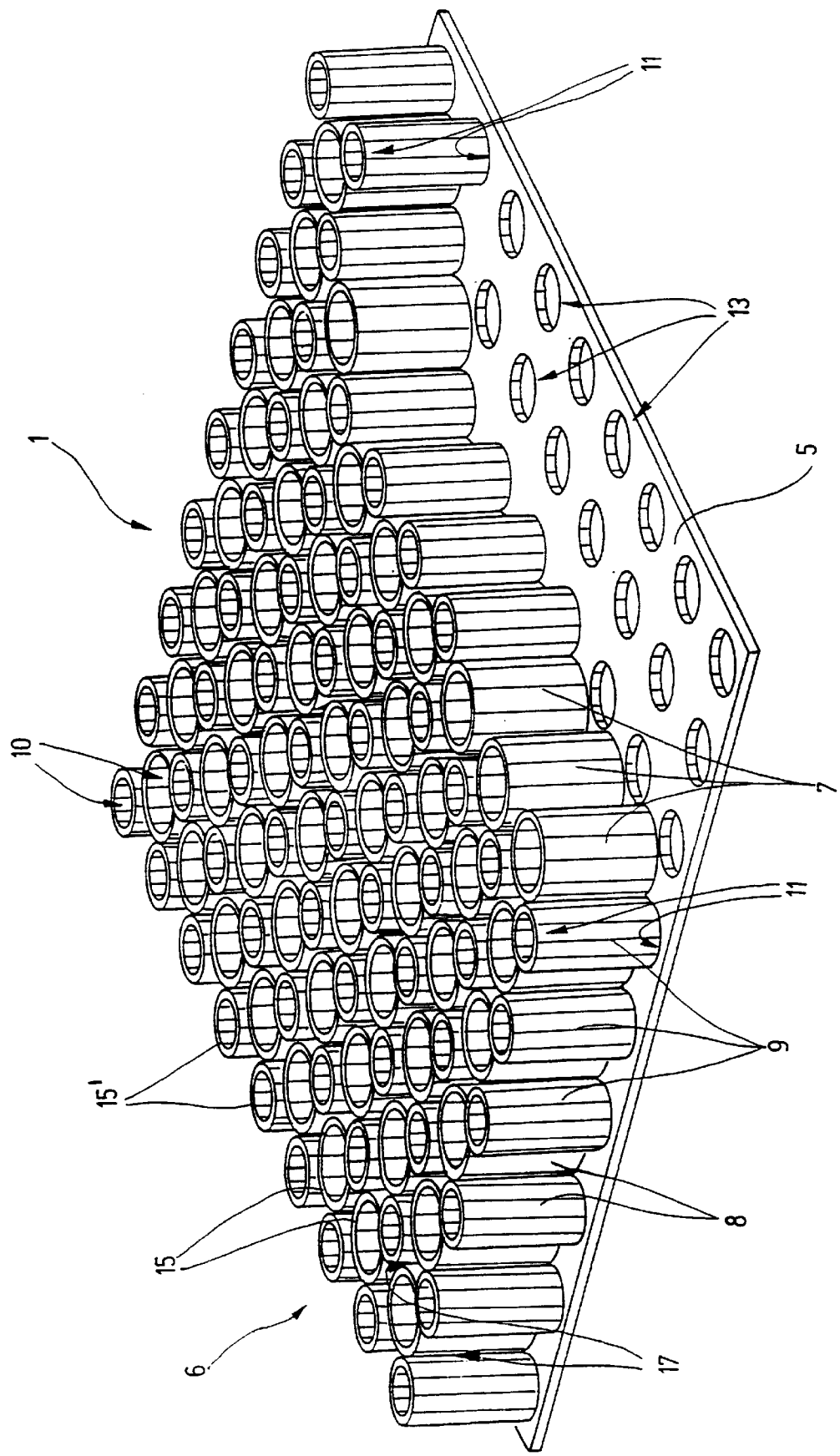
FIG. 2 shows a perspective view of the double-walled body according to FIG. 1, one covering panel and a number of tubes having been removed.

FIG. 2 shows parts of the double-walled body 1, namely the bottom cover panel 5 and a number of first and second tubes. Apertures 13 are made in the bottom cover panel 5 and in the top cover panel 3 (not illustrated here), and the contour and size of these apertures essentially correspond to the outer dimensions and outer contour of the second tubes 9. It is important for the internal diameter of the apertures 13 in the cover panels 3, 5 to be greater than the external diameter of the second tubes 9, in order that the end regions 11 of the second tubes 9 can engage in, and if appropriate through, the apertures 13. The apertures 13 and the tubes 6 preferably have the same cross-sectional shape or contour.

The apertures 13 can be cut into the cover panels 3, 5 by means of a laser or can be made in said panels by some other cutting method, for example punching. The second tubes 9 engage in the apertures 13 in the cover panels 3, 5 by way of their end regions 11. The first tubes 7 butt against the bottom cover panel 5 by way of their end surface 15. The end surfaces 15 run at right angles to the tube axes, with the result that the cover-panel surfaces rest flat on the end surfaces. The tubes 6 butt against one another on the bottom cover panel 5, which in this exemplary embodiment is rectangular, such that an interstice 17 is formed in the joining region between two tubes. Furthermore, the tubes 6 are aligned with respect to one another such that they are in surface contact with one another. This ensures a uniform flux of force in each case in the joining region between two tubes. This arrangement and alignment of the tubes provides a densely packed cover-panel surface, each of the first tubes 7 being arranged between four second tubes 9, and retained by the same, with the result that relative movement of the first tubes 7 parallel to the cover-panel surfaces is not possible. The first tubes 7 fixed in this way have a precisely defined position with respect to the surfaces of the two cover panels 3 and 5. As a result, of which the end surfaces 15 of the relatively thin-walled first tubes 7 can be integrally bonded to the cover panels 3, 5 by means of a laser, on account of the small active region of the latter.

The assembly of a double-walled body is described hereinbelow purely by way of example:

The bottom cover panel 5 is positioned on a planar underlying surface. The second tubes 9 are then inserted into the apertures 13 in the cover panel 5 by way of the end region 11. The first tubes 7 are arranged in the remaining interspaces. Finally, the top cover panel 3 is positioned on the tubes 7, 9 from above. In this case, the end region 11 of the second tubes 9 passes into the apertures 13. As a result, the top cover panel 3 moves downwards until its surface rests on the end surfaces 15 of the first tubes 7. The tubes 7 and 9 are then welded to the top cover panel 3 by means of a laser. The first tubes 7 are welded in that a laser beam acting on—or through—the cover panel melts the end surface 15 of the first tubes 7 and thus integrally bonds it to the cover panel. It is possible for the tubes and the cover panels to be joined by means of a soldered joint or adhesive bond, it being possible for the type of integral bonding to be selected preferably in dependence on the tube and cover-panel materials and/or the amount of loading to which the double-walled body may have to be subjected. Thereafter, the bottom cover panel 3 is joined to the tubes 7 and 9 in the same way. Fastening means, for example mounts for receiving clamping means, are introduced into the bore 10 of the second tubes 9 and retained in the bore 10 by means of a hardening compound. It is possible for the space between the cover panels 3 and 5 to be filled, if appropriate, with a plastic foam, this preventing the penetration of dirt and increasing the rigidity of the double-walled body.

The fastening means provided for the bore 10 may also be retained in the bore 10 by means of a releasable connection, for example a thread or a close fit. The preparatory work in the bore, that is to say thread cutting or the production of a close fit, can be done before the assembly of the double-walled body as long as there are no stringent tolerance-range requirements, that is to say these tolerance ranges may be relatively large. Large tolerance ranges are possible because thermal joining of the double-walled body may result in the individual parts (tubes, cover panels) warping. If the double-walled body is used in regions in which very small tolerance ranges and high component precision are required, it is also possible for the bore 10 of the second tubes 9, for accommodating the fastening means, to be machined following assembly of the double-walled body. For this purpose, the bore 10 of the second tubes 9 is oversized, in order that sufficient wall thickness of the tubes 9 is ensured even following precision machining of the bore 10.

Figure 3:
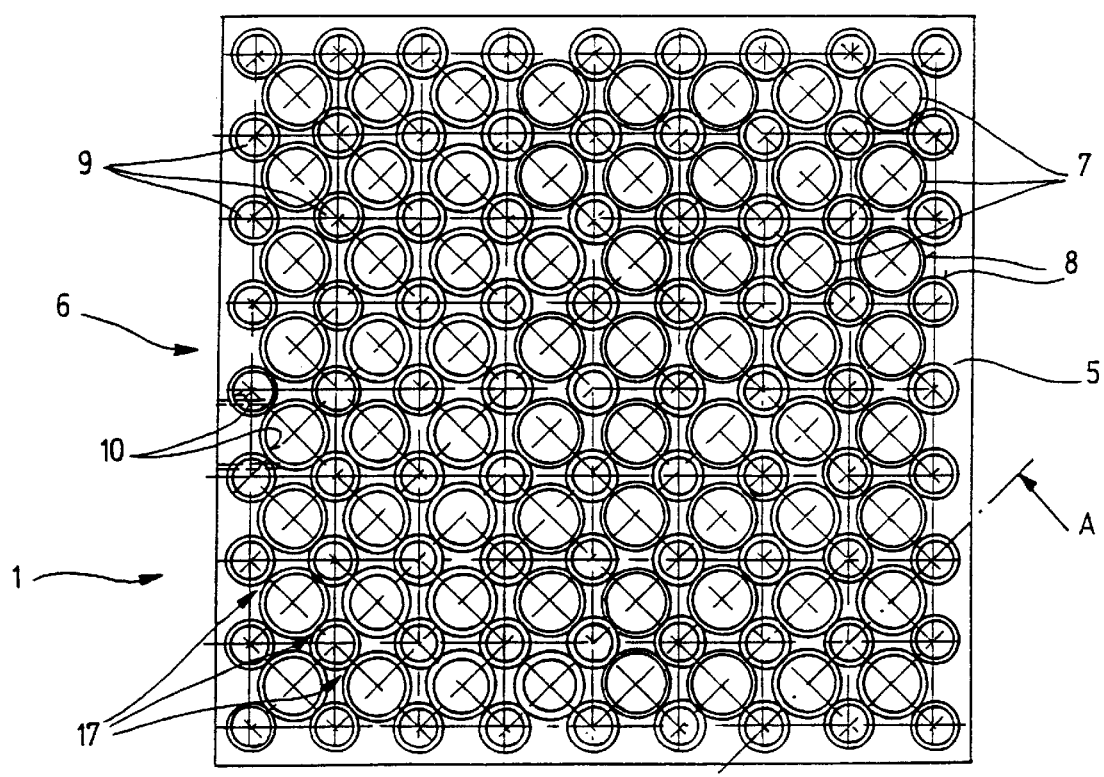
FIG. 3 shows a schematic plan view of the exemplary embodiment of the double-walled body according to FIG. 1.

FIG. 3 shows a plan view of the double-walled body 1 with cover panel 3 removed. The same parts are provided with the same designations, so you are referred to FIGS. 1 and 2 for the description thereof. It can be seen that the tubes 6 are in contact with one another, as a result of which they are supported directly against one another and thus increase the rigidity and damping of the double-walled body. The wall of the second tubes 9 is thicker in this case than the wall of the first tubes 7, since the bores 10 are oversized for subsequent machining steps. Furthermore, the first tubes 7 have a greater external diameter than the second tubes 9. The diameters of the tubes 7, 9 and the wall thicknesses are variable and may be selected, or coordinated with one another, for example in dependence on the required strength properties of the double-walled body.

Figure 4:
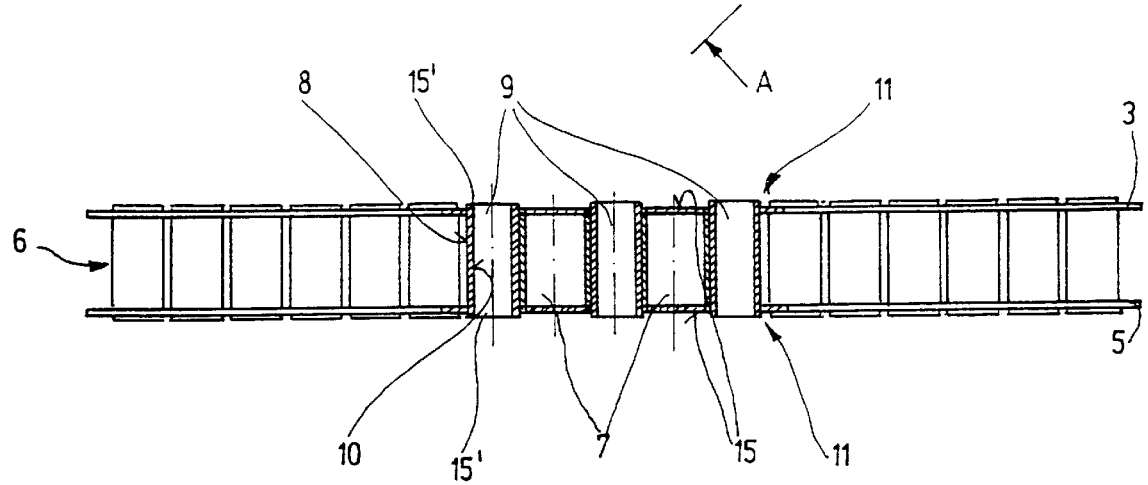
FIG. 4 shows a side view of the section of the double-walled body along section line A—A.

FIG. 4 shows a sectional view of the double-walled body 1 along the section line A—A depicted in FIG. 3, although in this case the top cover panel 3 has been placed in position. The surfaces of the cover panels 3 and 5 rest fully on the end surfaces 15 of the first tubes 7, with the result that the surfaces of the cover panels 3, 5 run parallel to one another.

The compact arrangement of the tubes 7, 9 and the homogenous bonding of the latter to the cover panels 3, 5 mean that the double-walled body 1 has high bending and torsional strength. Such a double-walled body can be produced cost-effectively by a lightweight construction method as a result of the straightforward construction and the geometries and cut edges which can be realized very easily. This is also the case because all the machining steps can be carried out by using numerically controlled machines and production can thus be automated.

What is claimed is:

1. A double walled body comprising:
 first and second spaced apart cover panels with a surface on one panel opposed to a surface on the other panel;
 a plurality of apertures defined in the cover panels, the cover panels being so placed and the apertures being so placed in the cover panels that the apertures are in respective sets with one aperture in each of the panels;
 respective pluralities of first and second cylinder shaped spacers, each spacer having an axis through the cover panels;
 the first spacers each having a length along its axis corresponding to the clear width distance between the cover panels to engage the opposed surfaces of the cover panels;
 the second spacers each having axially opposite end regions and each second spacer being of a length to cause its end regions to extend in a respective set of apertures in the cover panels for the respective spacer;
 whereby both of the first and second spacers support the cover panels.

2. The double walled body of claim 1, wherein the spacers each have a cylinder axis that runs orthogonally with respect to the cover panel opposed surfaces.

3. The double walled body of claim 2, wherein each of the spacers has opposite ends and the opposite ends include planar end surfaces which run orthogonally with respect to the cylinder axes.

4. The double walled body of claim 1, wherein each of the spacers comprises a cylindrical tube.

5. The double walled body of claim 4, wherein the tubular shapes of the spacers are polygonal tubes.

6. The double walled body of claim 4, wherein the second spacers have interiors, and at least some of the second spacer tube interiors are shaped for accommodating fastening means therein.

7. The double walled body of claim 6, wherein the interiors of some of the second spacer tubes accommodate fastening means by the interiors being threaded.

8. The double walled body of claim 6, further comprising a plastic filling for retaining the fastening means in the second tubes.

9. The double walled body of claim 1, wherein each of the spacers has an exterior lateral surface and the apertures are so placed in the cover panels and the spacers are so placed with respect to each other and the spacers are of such sizes with respect to each other that the exterior lateral surface of each spacer is in contact with and are supported by the exterior lateral surfaces of laterally adjacent ones of the spacers.

10. The double walled body of claim 1, wherein the first spacers also have opposite end regions and the end regions of both of the first spacers and the second spacers are joined to the cover panels at which the end regions are disposed.

11. The double walled body of claim 10, wherein the joinder of the end regions of the spacers to the cover panels is by an integral bonding.

12. The double walled body of claim 11, wherein the cover panels and the spacers are of a material that is adapted for thermal joining and the spacers are bonded to the cover panels by thermal joining to the cover panels.

13. The double walled body of claim 10, wherein each of the spacers is a tube, and the tubes of the spacers are cut to respective lengths of the spacers from bar stock by a cutting method.

14. The double walled body of claim 10, wherein the tubes are cut to length from bar stock by laser cutting and are adapted for setting up the double walled body without further machining of the tubes.

15. The double walled body of claim 1, further comprising a foam plastic filling between the cover panels.

* * * * *